US007744461B2

(12) United States Patent
Keser et al.

(10) Patent No.: US 7,744,461 B2
(45) Date of Patent: Jun. 29, 2010

(54) CUSTOMER PREFERENCE ELICITATION BASED ON A WEB-ENABLED BETTING GAME

(75) Inventors: Claudia Keser, Yorktown Heights, NY (US); William Tulskie, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 11/619,402

(22) Filed: Jan. 3, 2007

(65) Prior Publication Data

US 2008/0162263 A1 Jul. 3, 2008

(51) Int. Cl.
*A63F 13/00* (2006.01)
*G06F 17/30* (2006.01)

(52) U.S. Cl. .......................................... 463/25; 705/10

(58) Field of Classification Search ............... 463/1-69; 705/10
See application file for complete search history.

(56) References Cited

U.S. PATENT DOCUMENTS 6,068,552 A * 5/2000 Walker et al. ................. 463/21
2002/0099622 A1* 7/2002 Langhammer ............... 705/26

* cited by examiner

*Primary Examiner*—Scott Jones
(74) *Attorney, Agent, or Firm*—McGinn IP Law Group PLLC; Stephen C. Kaufman, Esq.

(57) ABSTRACT

A method of eliciting customer preferences includes establishing a computer-enabled facility accessible to the target audience of participants, determining features to collect bets on, determining which participants may register, determining a betting period, determining betting rules, determining how to decide winners and prizes, registering the participants participation using the website, instructing the participants about procedures of abetting game and list of possible product features, betting, by the participants, on the product features the participants think will be preferred by the general public, determining whether an end of the betting period has been reached, determining, at the end of the betting period, average bets for each of the product features, predicting average customer preferences based on the average bets, determining a score of each participant who made bets, determining which of the participants has a best score, and using resulting preference information for production planning.

2 Claims, 1 Drawing Sheet

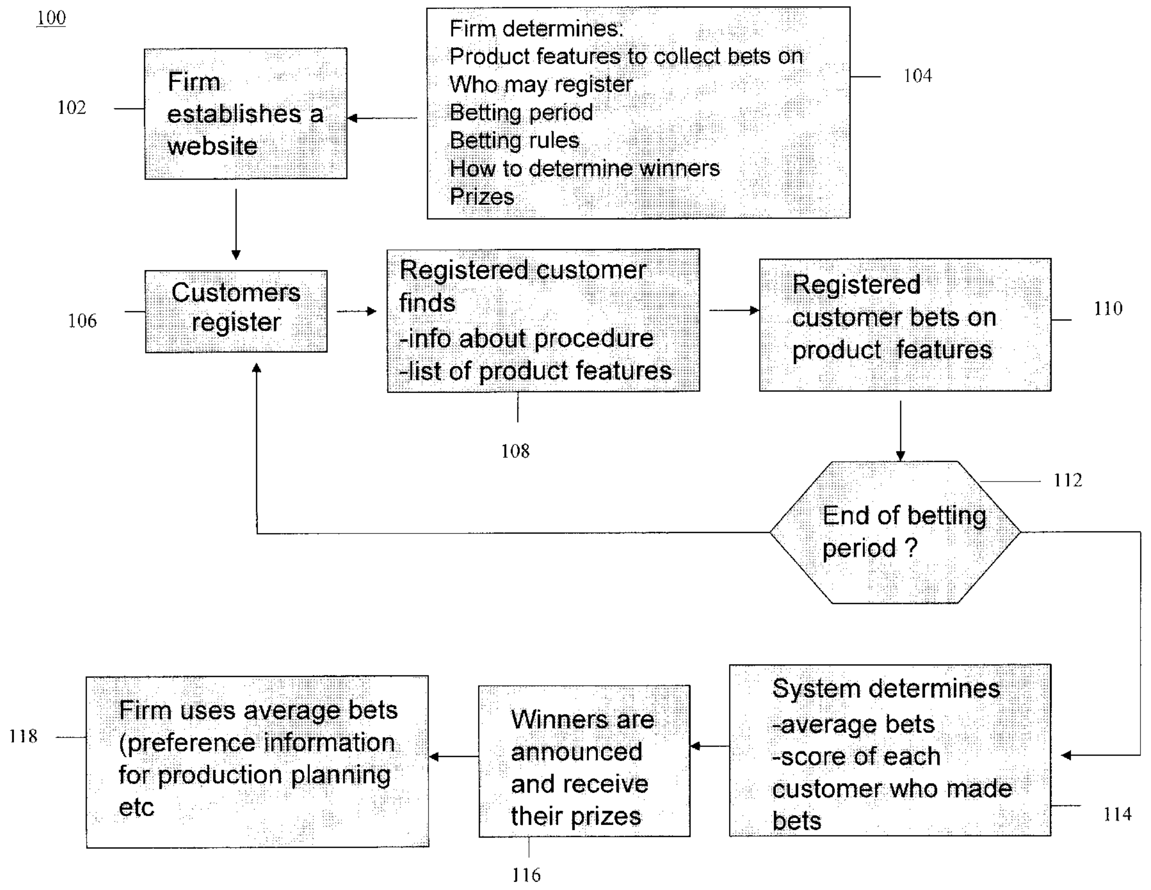
100
Firm establishes a website
102
Firm determines:
Product features to collect bets on
Who may register
Betting period
Betting rules
How to determine winners
Prizes
104
Customers register
106
Registered customer finds
-info about procedure
-list of product features
108
Registered customer bets on product features
110
End of betting period ?
112
System determines
-average bets
-score of each customer who made bets
114
Winners are announced and receive their prizes
116
Firm uses average bets (preference information for production planning etc
118

CUSTOMER PREFERENCE ELICITATION BASED ON A WEB-ENABLED BETTING GAME

BACKGROUND OF THE INVENTION

1. Field of the Invention

The present invention generally relates to the elicitation of customer preferences. More particularly, the present invention is related to a method and structure for eliciting true and accurate customer preferences using a web-enabled betting game.

2. Description of the Related Art

The traditional methods used in marketing to elicit customer preferences are surveys, whether on-line or otherwise, conjoint analysis, focus groups, or statistical sales data analysis.

A research team at MIT/UCLA has conducted controlled experiments with students using an on-line double auction procedure to predict customer preferences for new product features (concepts). They compared these predictions to those obtained by traditional methods, such as conjoint analysis, and found consistencies.

Double auction procedures have been tested for other kinds of predictions in corporate interest. For example, Eli Lilly's research division tested such procedures to predict the success of newly developed drugs, where participants were Lilly employees in some trials and external customers in other trials. Hewlett Packard (HP) tested double auction procedures with their executives for revenue forecasting. HP has also used a betting game for revenue forecasting with their executives. However, their bets are not made on a public opinion or preference but on actual sales data. Double auction procedures are also used for the IOWA Election Markets and the Hollywood Exchange Markets.

It is typical that practitioners pay subjects a participation fee to participate in studies employing the traditional methods (i.e., those traditional methods mentioned above) to achieve a desired level of participation. A known difficulty of these methods centers in maintaining participant interest. That is, once the participants appear for study, they typically want it to end as quickly as possible. The participants have no real incentive to provide good quality answers.

In addition to the incentive hazard, all of the participants must be paid to participate. This set a minimum expense on such studies that is a function of how many participants are needed, the inconvenience of traveling to/from or otherwise joining the study, and the expected duration of the study. Typically, the participants are at least aware of the other participants (how many others there are, their attitude toward the proceeding, some non-verbal influences in reaction to inquiries, etc.) Obviously, this awareness can bias responses. While it is possible to mitigate or eliminate these biases and influences through careful isolation of participants, such effort typically entails substantial additional costs.

Last, in such in-person or other study formats, participants are usually willing to devote only so much time and attention questions at hand. Consequently, there is usually a kind of consideration bias. Consider the case where a telemarketer surveys a study participant for their preferences regarding a new model car. The respondent will give typically a quick reaction to preference questions—certainly more impetuous than if they were actually buying the car in question and spending their own money on the features offered. In that survey setting, they typically have no expectation of actually getting the car. They may have an expectation of receiving a gift of some kind—but typically not the product and features that are the subject of the survey.

SUMMARY OF THE INVENTION

In view of the foregoing and other exemplary problems, drawbacks, and disadvantages of the conventional methods and structures, an exemplary feature of the present invention is to provide a method and structure that solves the problems of incentive hazards, excessive costs, and consideration biases normally encountered in preference elicitation.

In accordance with a first aspect of the present invention, a method of eliciting customer preferences includes establishing a computer-enabled facility accessible to the target audience of participants, determining features to collect bets on, determining which participants may register, determining a betting period, determining betting rules, determining how to decide winners and prizes, registering the participants participation using the website, instructing the participants about procedures of a betting game and list of possible product features, betting, by the participants, on the product features the participants think will be preferred by the general public, determining whether an end of the betting period has been reached, determining, at the end of the betting period, average bets for each of the product features, predicting average customer preferences based on the average bets, determining a score of each participant who made bets, determining which of the participants has a best score, and using resulting preference information for production planning.

The present invention uses a computer-based betting game procedure with potential customers, to predict their preferences. The user of the invention establishes a computer-enabled facility accessible to the target audience of participants. Participants can access the website and register for participation, where they are instructed about the procedure of the betting game, find a list of features of a potential new product, and can bet on the features they think will be the most preferred ones by the general public. Alternatively, they can be asked for their own preferences. At the end of the betting period, average bets for each of the features are determined. These averages predict average customer preferences. The higher the average bet for a feature the more it is preferred. Participants can be scored according to a variety of criteria that correspond to the accuracy of their predictions. Based on the accuracy of their predictions as indicated by their scores, the winning participants are selected.

The present method provides more accurate predictions than by traditional methods since it provides a salient incentive to reveal ones own preferences or what one thinks is the public preference. The incentive is monetary in the case of predictions of the preferences of others. The incentive is the actual product configured with the participant's preferred features in the case that participant is asked to reveal their own preferences. A third option would combine these two cases. That is a participant predicting the preferences of others could be awarded the product configured as they choose.

If individuals hold little pieces of information about their own preferences and those of individuals in their environments (family, friends, neighbors, colleagues at work) a betting procedure with an expected payoff encourages individual information owners to volunteer that information in exchange for a chance to realize the payoff. The net effect is that the individual pieces of preference information are aggregated into a more comprehensive picture of overall preferences. The payoff incentive helps achieve a high participation rate as is demonstrated with the traditional methods. Moreover, in contrast to the double auction procedure, a betting game helps to aggregate information without simultaneously disseminating it.

Use of a website to implement the invention allows for minimizing costs of participation since broad free access is available in many parts of the world now and is increasingly available. Moreover, participants are actually encouraged to take the time needed to get accurate information from their associates and/or think carefully about their own preferences—as carefully as if they were purchasing the product of interest.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 1 illustrates a method 100 of eliciting customer preferences in accordance with an exemplary embodiment of the present invention.

DETAILED DESCRIPTION OF EXEMPLARY EMBODIMENTS OF THE INVENTION

Referring now to the drawings, and more particularly to FIG. 1, there are shown exemplary embodiments of the method and structures according to the present invention.

FIG. 1 illustrates a method (and system) 100 of eliciting a customer preference in accordance with certain exemplary embodiments of the present invention.

A firm (e.g., 102) (or its contractor) establishes a computer-enabled facility accessible to the target audience of participants. The facility may include a public or private website. The invention, however, may include any computer-based facility supporting the requisite functions.

The firm (e.g., 102) determines which features to collect bets on, who may register, the betting period, the betting rules, how to determine winners and prizes (e.g., 104).

Study participants, typically customers, can go to the website and register for participation (e.g., 106).

Participating customers are instructed about the procedure of the betting game (e.g., 108). Participating customers find a list of features, e.g. 10 features of a potential new car type.

Customers can bet on the features they think will be the most preferred ones by the general public (e.g., 110). An example betting procedure is as follows. Each participant receives 100 game points that he or she can allocate among the 10 features. This means, for example, participants can bet all of their 100 game points on one single feature. The participants can also bet 10 points on each of the 10 features if the participant thinks that all 10 features will be equally preferred. Participants can also choose any other allocation of their 100 points among the features.

An alternative means of indicating preferences would be a ranking of the alternative features from most popular to least. Yet another preference indicator is to distribute the features among a set of categories. An example set containing three categories would be: most popular, somewhat popular, and least popular. The invention includes a mechanism such as those presented for indicating expected preference for product features.

Relationships among the features may be used to constrain the allowable betting options. A car is an example of a product with feature constraints. Example features could include transmission (automatic or manual), suspension (sport or touring), and engine (high performance or economical). In this case, a given bet can only select one preference (such as automatic or manual) within the transmission feature. In addition, the manufacturer may be able to offer only the touring suspension with the automatic transmission due to limitations in manufacturing capability. Therefore, the presentation of the feature selections should account for such constraints and allow only viable bets or preference selections to be submitted. In some instances, users of the invention will want to ascertain the most popular combinations of features as a means of understand needed new manufacturing capability. In this case, the betting procedure would not enforce constraints among preference selections. The invention includes a mechanism for optionally enforcing constraints among feature preferences.

It is then determined whether the end of the betting period has been reached (e.g., 112). Alternative means are possible to make this determination. The end of the betting may be determined by fixed date and time, by a predefined number of placed bets, or by an analysis of the bets. In this third case, typically a convergence of the bets on a small number of most popular feature combinations would provided a good stopping indicator. The invention contains any such mechanism to determine the end of the betting period.

At the end of the betting period, e.g. May 1 to May 15, average bets for each of the features are determined (e.g., 114). These averages predict average customer preferences. The higher the average bet for a feature the more it is preferred.

Additionally, the method (or system) determines the score of each customer who made bets. Participating customers are scored based on, for example, the sum of squared distance from predicted preferences. For example, the average preferences may be provided as given in the first column of the table below. If participant Anna's/Hugo's bet is as given in the third/fifth column of this table then their score is 411/3234.

| (1) Feature | (2) Average bet | (3) Anna's bet | (4) Squared distance of Anna's bet from average | (5) Hugo's bet | (6) Squared distance of Hugo's bet from average |
|---|---|---|---|---|---|
| 1 | 0 | 0 | 0 | 10 | 100 |
| 2 | 2 | 0 | 4 | 10 | 64 |
| 3 | 2 | 0 | 4 | 10 | 64 |
| 4 | 1 | 0 | 1 | 10 | 81 |
| 5 | 3 | 0 | 9 | 10 | 49 |
| 6 | 1 | 0 | 1 | 10 | 81 |
| 7 | 2 | 0 | 4 | 10 | 64 |
| 8 | 57 | 50 | 49 | 10 | 2209 |
| 9 | 31 | 50 | 361 | 10 | 441 |
| 10 | 1 | 0 | 1 | 10 | 81 |

The winning participant is determined, using one of several potential methods (e.g., 116). For example, the participant with the best score (lowest distance) wins a prize (e.g., a car). Alternatively, the inverse of the score determines the probability of winning a prize in a raffle (the lower a participant's score, the higher his or her probability of winning. As above several winners may be selected. The invention includes any method that identifies the winning participant(s) by methods of scoring participant choices according to the most commonly selected preferences. Note that participants can be grouped into subsets by common preferences with winners assigned within these subsets. Moreover, the subsets can be determined at the start of the game or as a result of the revealed preferences of the participants. In any of these cases, the invention includes the production of such preference information for use the producer of the subject product in such applications as production planning, etc (e.g., 118).

The method and system of the present invention may be used in a typical hardware configuration of an information handling/computer system, which preferably has at least one processor or central processing unit (CPU).

The CPUs are interconnected via a system bus to a random access memory (RAM), read-only memory (ROM), input/output (I/O) adapter (for connecting peripheral devices such as disk units and tape drives to the bus, user interface adapter (for connecting a keyboard, mouse, speaker, microphone, and/or other user interface device to the bus), a communication adapter for connecting an information handling system to a data processing network, the Internet, an Intranet, a personal area network (PAN), etc., and a display adapter for connecting the bus to a display device and/or printer (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware above, to perform the method of the invention.

This signal-bearing media may include, for example, a RAM contained within the CPU, as represented by the fast-access storage for example. Alternatively, the instructions may be contained in another signal-bearing media, such as a magnetic data storage diskette, directly or indirectly accessible by the CPU. Whether contained in the diskette, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

The software will present preference choices and allow individual participants to designate and submit preferences. The software will also record these preferences during the game. The software will determine the end of the game according to a stopping rule or set of criteria and will compute participant scores based on one or more programmed scoring algorithms. Finally, the software will identify the winner(s) and present statistical summaries of gathered preference information and unprocessed preference information for analyses by other tools.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of eliciting customer preferences, comprising:

establishing a computer-enabled facility accessible to the target audience of participants;

determining features to collect bets on;

determining which participants may register;

determining a betting period;

determining betting rules;

determining how to decide winners and prizes;

registering said participants participation using said website;

instructing said participants about procedures of abetting game and list of possible product features;

betting, by said participants, on the product features said participants think will be preferred by the general public;

determining whether an end of the betting period has been reached;

determining, at the end of the betting period, average bets for each of the product features;

predicting average customer preferences based on said average bets;

determining a score of each participant who made bets;

determining which of said participants has a best score; and using resulting preference information for production planning.

2. The method according to claim 1, wherein said betting comprises providing each participant with 100 points that the participant can allocate among each of said features.

* * * * *